United States Patent [19]

Hollander

[11] Patent Number: 4,471,209

[45] Date of Patent: Sep. 11, 1984

[54] ELECTRICALLY HEATED HAND GRIPS FOR VEHICLE HANDLE BARS

[76] Inventor: James M. Hollander, 3103 Hampton Manor Apts., Northampton, Mass. 01060

[21] Appl. No.: 336,435

[22] Filed: Dec. 31, 1981

[51] Int. Cl.³ .................. H05B 3/18; B62D 1/12; B62K 21/26

[52] U.S. Cl. .................. 219/204; 74/551.8; 74/551.9; 219/535; 219/547

[58] Field of Search .............. 219/200, 201, 202, 204, 219/535, 547; 74/551.8, 551.9

[56] References Cited

U.S. PATENT DOCUMENTS

| 744,739 | 11/1903 | Fliess | 219/204 X |
|---|---|---|---|
| 1,830,221 | 11/1931 | Blue | 219/204 X |

FOREIGN PATENT DOCUMENTS

| 75625 | 3/1953 | Denmark | 74/551.9 |
|---|---|---|---|
| 1064448 | 12/1953 | France | 219/204 |
| 1082551 | 6/1954 | France | 219/204 |
| 2254204 | 7/1975 | France | 74/551.8 |
| 500953 | 11/1954 | Italy | 219/204 |
| 510625 | 1/1955 | Italy | 219/204 |
| 550836 | 7/1955 | Italy | 219/204 |
| 169903 | 9/1934 | Switzerland | 74/551.9 |
| 222109 | 9/1942 | Switzerland | 219/204 |
| 348981 | 5/1931 | United Kingdom | 74/551.9 |
| 571069 | 8/1945 | United Kingdom | 219/204 |
| 592660 | 2/1978 | U.S.S.R. | 74/551.9 |

*Primary Examiner*—A. Bartis
*Attorney, Agent, or Firm*—Chapin, Neal & Dempsey

[57] ABSTRACT

Electrically heated hand grips for the handle bars of vehicles such as motorcycles and the like are fabricated with an inner cylindrical sleeve member molded of synthetic plastic material. An electrical resistance heater wire coil is embedded in each sleeve. The inner surface of said the sleeve includes a plurality of circumferentially spaced and axially extending ribs, and the outer surface of said the sleeve includes a longitudinally extending land and groove pattern. The spaces between the ribs on the inner surface and the grooves on the outer surface of the sleeve have radially coextensive, overlapping circumferential portions where the sleeve is of minimum wall thickness. The resistance wire coil is disposed within said the sleeve member such that it is spaced a substantial distance from the inner surface of the ribs and the outer surface of the lands. The diameter of the heater wire is not less than the minimum wall thickness of the sleeve. The heated hand grip also includes an outer sheath of resilient material which is molded onto and encapsulates the inner sleeve. Electrical lead wires are connected to the ends of said electrical resistance wires.

4 Claims, 4 Drawing Figures

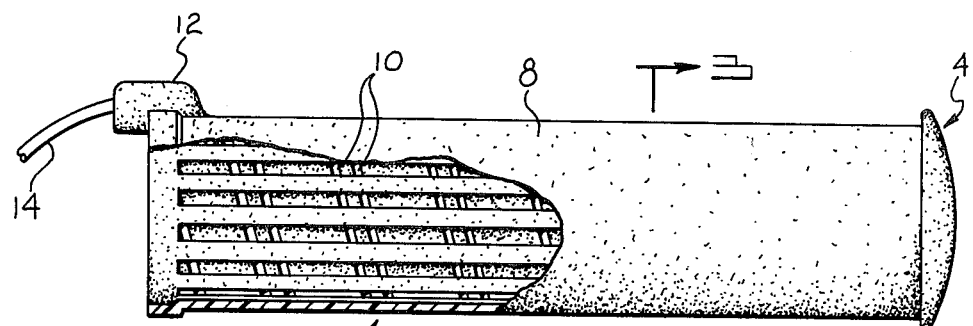
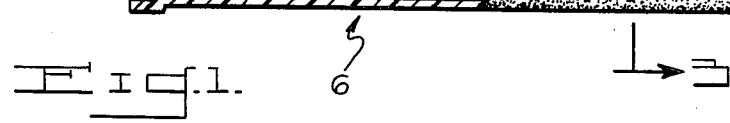
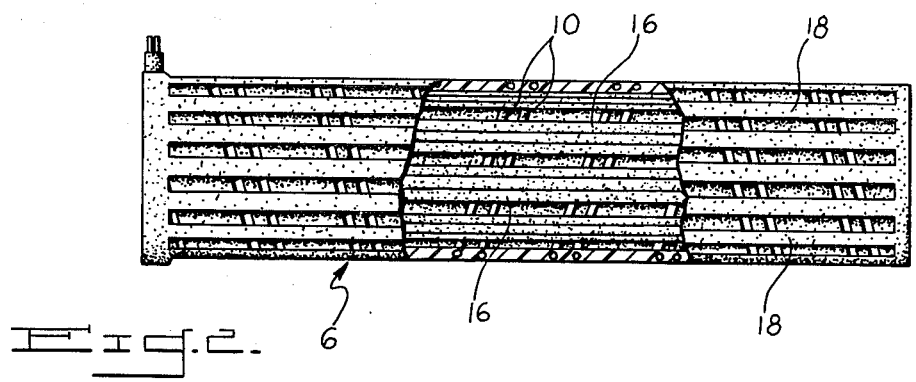
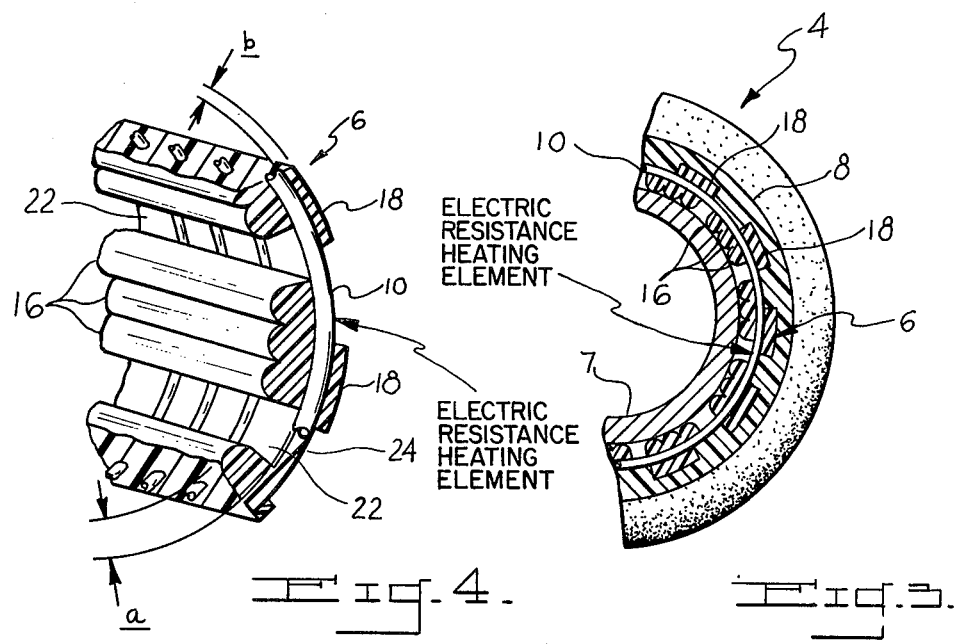

ELECTRICALLY HEATED HAND GRIPS FOR VEHICLE HANDLE BARS

BACKGROUND OF THE INVENTION

This invention relates to handle bar grips as more particularly directed to said grips having electric heating means provided therein and to the method of manufacturing such grips.

In the operation of unenclosed motor vehicles such as motorcycles and snowmobiles, the operator is exposed to the outside air and is thus subjected to the relative wind generated by the vehicle's movement through the ambient air. At low tempeartures, a severe wind chill effect is encountered, and this can become a serious safety hazard if the operator's hands become so chilled as to inhibit their manipulation of the vehicle and its controls. Since the hands are vital in the control of such vehicles, if they are not kept reasonably warm, extremely dangerous operating failures can result.

Further, since the rider must necessarily grip the handlebars with some considerable pressure, the hands per se are relatively inactive and circulation is restricted. Moreover, while most parts of the body, including the feet, can be protected against cold by the addition of layers of bulky clothing, there is a practical limit to the bulkiness that can be provided in gloves because it is necessary to preserve freedom of movement and "feel" in the hands.

The metal handlebars themselves also constitute a large heat sink which, when cold, rapidly drains heat from the hands.

In any event, since the handlebars control or influence bike balance, steering, clutch, throttle and brake control, it is evident that numb hands caused by the cold present a significant safety problem to the rider.

The problem of providing effective and economical heating means for handle bars grips has been recognized for many years. In U.S. Pat. No. 3,667,315, cartridge heaters are disposed within the handle bars per se. In French Pat. No. 2,254,204, heated handle bar grips are shown, but these involve the use of a separate heating segment adapted to be fitted into a cavity or slot provided within a molded handle bar grip. Swiss Pat. No. 169,903 also discloses heated handle bar grips with electrical heating elements disposed within an extension clamped on the end of a handle bar.

While the above referenced French patent broadly discloses the concept of electrically heated handle bar grips, it fails to disclose a construction therefor to achieve uniform longitudinal and circumferential heating throughout the grip. Moreover, both these prior foreign patents fail to show a heated hand grip construction which readily lends itself to an economical fabrication process. Further, these patents do not teach a hand grip construction for mounting directly onto the handle bars of a vehicle and in which there is minimal transfer of heat to the handle bars, while optimizing the heat transfer to the hands of the vehicle operator.

The principal object of this invention is to provide electrically heated hand grips of improved construction which overcome the drawbacks of the prior art and heretofore available hand grips of this type.

Another object of this invention is to provide electrically heated hand grips having constructional features which lend themselves to a simple and economical manufacturing process.

A further object to this invention is to provide hand grips of the above type in which the heat transfer to the handle bars on which they are fitted is reduced while heat transfer to the hands is optimized.

This invention relates to electrically heated hand grips in which a helically wound electrical resistance heater wire is molded within a synthetic plastic sleeve. The inner and outer surfaces of the sleeve are longitudinally corrugated with alternate ridges and grooves. The grooves on both the inner and outer surfaces of the sleeve have radially coextensive, overlapping circumferential portions at which the sleeve is of minimum wall thickness. The diameter of the heater wire is not less than the minimum wall thickness.

The above and other objects and advantages of this invention will be more ready to the following detailed description read in accompaniment with the drawings in which:

FIG. 1 is an elevational view partly in section illustrating heated hand grips of the type embodied in my invention;

FIG. 2 is an elevational view of a component of the hand grip shown in FIG. 1;

FIG. 3 is a partial section taken along line 3—3 of FIG. 1; and

FIG. 4 is an enlarged cross sectional view illustrating a portion of FIG. 3.

Referring in detail to the drawings, in FIG. 1 is shown a handle bar heated hand grip for the type embodying in my invention. The hand grip comprises an outer elastomeric sheath 8 having an outer diameter to provide a comfortable hand grip for a vehicle operator. Disposed within the outer sheath pad is a generally cylindrical sleeve 6 or premold 6.

The sleeve 6 also shown in FIG. 2, includes one open end to the left and a substantially closed end to the right as shown in the drawing. The sleeve is preferably molded of a suitable synthetic plastic material such as polypropylene having suitable thermal properties to withstand the heat generated by the resistance heating wires 10 embedded therein. The inner surface of the sleeve as best seen in FIG. 2 comprises a longitudinally extending series of circumferentially spaced ribs 16 with grooves therebetween as shown in FIGS. 3 and 4. The outer surface of the sleeve includes a longitudinally extending land and groove pattern as illustrated at 18 in the drawing.

In effect, the inner and outer surfaces can be said to be longitudinally corrugated with ridges or ribs 16 and grooves 22 on the inner surface and ridges or lands 18 and grooves 24 on the outer surface. By reference to FIGS. 3 and 4, it will be noted that the grooves on the inner and outer surfaces 22 and 24, respectively, have radially coextensive, overlapping circumferential portions as is also true of the circumferential portions of the ribs 16 and lands 18.

The resistance wire, preferably insulated, may suitably have a diameter of about 0.025 inches and for each hand grip an overall length of about 60 inches and a resistance of about 0.480 ohms/per foot.

The resistance wire is preferably wound in a double helix so that its terminal ends may be located at the inner end of the sleeve as shown at 12 in FIG. 1. The resistance wire is first wound on a mandrel of suitable diameter to provide a helical self-supporting coil which may thereafter be inserted in a mold cavity having an outer and inner wall construction to mold the inner tubular sleeve as shown in 6 in FIG. 2.

The cavity of the mold and diameter of the heating wire coil are selected such that the heating coil will be embedded within the plastic sleeve, also called a "premold". As most accurately illustrated in FIG. 4, an enlarged cross sectional view, the diameter of the wire coil is such that its distance from the inner surface of the ribs 16 shown at "a" is substantially greater than its distance is from the outer surface of the lands 18 of the premold 6. This means that heat generated by the coil will be spaced a substantial distance from the handle bar shown at 7 in FIG. 3. This is important, since the handle bar acts as a heat sink, and much of the heat generated by the coil would otherwise be absorbed by the vehicle handle bars rather than being transmitted outwardly to the hands of the operator. With the heated hand grip constructed in accordance with my invention, preferential heat transfer is outwardly rather than inwardly, and this is achieved without using any additional insulated sleeve disposed between the heat source and the handle bar.

After the premold or plastic sleeve 6 has been completed it may be placed in another mold, and a suitable synthetic plastic such as thermoplastic rubber material is injected into the mold cavity to form, in situ, on the outer surface of the premold the final surface of the hand grip. Preferably, the hand grip is made of a suitably resilient elastomer and although not shown in the drawing, may be textured or patterned with a suitable surface finish having enhanced gripping characteristics.

Having thus disclosed my invention what is claimed is:

1. Electrically heated hand grips for handle bars comprising a molded inner sleeve, generally cylindrical, having a longitudinally ribbed inner surface, a resistance wire coil imbedded in said sleeve and an elastomeric sheath molded onto the outer surface of said sleeve, the outer surface of said sleeve including a longitudinally extending land and groove pattern, said heating wire being helically wound to form a coil having an inner diameter substantially greater than the inner diameter of said sleeve defined by the inner surface of said ribs and an outer diameter less than the outer diameter of said sleeve defined by said lands, the distance of said resistance wire coil to the outer surface of said lands being substantially less than the distance of the coil from the inner surface of said ribs, whereby the heat generated by said coil travels shorter to the outer surface of the grip than toward its inner surface.

2. Electrically heated hand grips for handle bars comprising a molded sleeve of generally cylindrical transverse cross-section, said sleeve having inner and outer surfaces of circumferentially-spaced, longitudinally extending corrugations of alternate ridges and grooves and a helically wound electrical resistance heater wire partially imbedded in said sleeve, the groove portions on the inner and outer surfaces of said sleeve having radially coextensive, overlapping circumferential portions in which the sleeve is of minimum wall thickness, the outer diameter of the heater wire being not less than said minimum wall thickness.

3. Electrically heated hand grips as set forth in claim 2 in which said heater wire is wound in a double helix with the terminal ends of the wire located at one end of said sleeve.

4. Electrically heated hand grips as set forth in claim 2, in which a sheath is molded onto the outer surface of said sleeve.

* * * * *